(12) United States Patent
Rives et al.

(10) Patent No.: US 6,907,267 B2
(45) Date of Patent: Jun. 14, 2005

(54) LOOP-POWERED T1 RADIO

(75) Inventors: Eric Malcolm Rives, Hampton Cove, AL (US); David Hoy Nabors, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 552 days.

(21) Appl. No.: 09/771,370

(22) Filed: Jan. 26, 2001

(65) Prior Publication Data

US 2002/0103011 A1 Aug. 1, 2002

(51) Int. Cl.$^7$ ................................................ H04B 1/38
(52) U.S. Cl. ...................... 455/560; 455/561; 455/3.02; 455/507
(58) Field of Search ................................ 455/561, 560, 455/507, 3.02, 3.01, 462, 465, 524

(56) References Cited

U.S. PATENT DOCUMENTS

| | | | | |
|---|---|---|---|---|
| 5,642,412 A | | 6/1997 | Reymond | ................... 379/348 |
| 5,812,955 A | * | 9/1998 | Dent et al. | ................... 455/561 |
| 6,078,821 A | * | 6/2000 | Kaschke et al. | ............. 455/507 |
| 6,112,086 A | * | 8/2000 | Wala | ........................... 455/438 |
| 6,532,240 B1 | * | 3/2003 | Jeong | ........................ 370/465 |
| 6,640,084 B2 | * | 10/2003 | Pande et al. | ............... 455/3.01 |
| 6,763,221 B2 | * | 7/2004 | Chandler | ................... 455/3.01 |
| 6,775,522 B2 | * | 8/2004 | Schornack et al. | ......... 455/561 |
| 6,831,902 B1 | * | 12/2004 | Dougherty et al. | ......... 455/524 |
| 2004/0248593 A1 | * | 12/2004 | Hicks, III et al. | .......... 455/462 |

* cited by examiner

Primary Examiner—Edward F. Urban
Assistant Examiner—Lana Le
(74) Attorney, Agent, or Firm—Allen, Dyer, Doppelt, Milbrath & Gilchrist, P.A.

(57) ABSTRACT

A loop-powered T1 digital radio is coupled to a powered T1 wireline. The radio not only interfaces digital T1 communication signals with the line, but is configured to extract and convert electrical power from the line to voltages necessary for operating the radio. The loop-powered T1 radio transmits and receives RF energy containing the T1 digital communication signals with respect to a remote digital radio, such as a 'blue tooth' type radio.

7 Claims, 1 Drawing Sheet

LOOP-POWERED T1 RADIO

FIELD OF THE INVENTION

The present invention relates in general to telecommunication systems and subsystems therefor, and is particularly directed to a loop-powered digital radio, that is coupled to and powered by a digital communication signal-transporting wireline (such as a powered T1 wireline). The radio of the invention not only interfaces digital communication signals with the line, but is configured to extract electrical power from the line and convert the extracted power to voltages necessary for operating the radio. The radio transmits and receives digital communication signals with respect to a remote and relatively low wattage digital (e.g., 'blue tooth' radio).

BACKGROUND OF THE INVENTION

Although legacy (copper) wirelines serve as a principal information transport backbone for a variety of telecommunication networks, other signal transport technologies, particularly those capable of relatively wideband service, including coaxial cable, fiber optic and wireless systems, have undergone rapid development and now serve a diversity of environments and users. A particular advantage of wireless (e.g., radio) service is the fact that it is very flexible and not limited to serving only customers having access to existing or readily installable cable plants.

Moreover, there are many environments, such as, but not limited to portable data terminal equipments (DTEs), where a digital wireless subsystem may be the only practical means of communication. In order to provide digital communication service, the wireless (radio) subsystem must not only be interfaced with an existing digital network's infrastructure, which typically includes legacy wireline links (that may contain one or more repeaters) coupled to an incumbent local exchange carrier (ILEC), such as a Bell operating company (RBOC) site, but the digital radio site which provides access to the wireline must also provide a source of electrical power. In many environments, the required power supply is either not readily available, or its cost of installation is prohibitively expensive.

SUMMARY OF THE INVENTION

In accordance with the present invention, such lack of, or the unacceptably high cost of installing a power supply for a wireless communication equipment intended to wirelessly connect existing digital communication network equipment with a remote site is successfully remedied by loop-powered digital (T1) radio. As will be described, the loop-powered T1 radio of the invention is configured to be installable at a location (such as a rooftop or pole site), that does not readily afford access to a dedicated power supply for the radio. The remote radio may comprise a blue tooth digital radio associated with portable digital terminal equipment, such as a notebook computer, or a remote digital radio that terminates a separate powered wireline.

For this purpose, the loop-powered radio of the invention includes a line interface coupled to tip and ring portions of respective transmit and receive segments of a powered T1 wireline link. The line interface contains conventional coupling transformer circuitry that extracts (+/−48 V) DC voltages of the powered tip and ring wireline pairs for application to a DC-DC voltage converter, and also interfaces digital signals transported by the powered T1 link to a T1 framer chip. The DC-DC converter scales down the +/−48 VDC voltages supplied by the span to standard voltages (e.g., +5 V and +12 V), used to power the digital signaling and transceiver electronics of the radio.

The transceiver section of the radio is preferably of standard (e.g. 'blue tooth'-compatible) design and includes a transmitter unit coupled to receive the digital baseband signals from the T1 framer chip and perform modulation and up-conversion to an FCC-conformal band RF signal (e.g., 2.4 GHz spread spectrum signal). The radio's receiver unit performs down-conversion and demodulation of the (2.4 GHz) RF signal to baseband for application to the T1 framer chip.

By extracting electrical power from the line and converting the extracted power to voltages for operating its transceiver and signal processing components, the invention effectively eliminates the need of having to locate the radio where a separate dedicated power supply is either available or can be installed. Being totally self-contained, the loop-powered radio of the invention may be installed practically anywhere access to a powered wireline is available.

DETAILED DESCRIPTION

Before describing in detail the new and improved loop-powered T1 radio of the present invention, it should be observed that the invention resides primarily in modular arrangements of conventional wireless (radio) transceiver components, digital communication circuits, power supply and interface components. In terms of a practical implementation that facilitates their manufacture and installation at a communication site having access to an existing digital signal transporting wireline cable plant, these modular arrangements may be readily configured using field programmable gate array (FPGA) and application specific integrated circuit (ASIC) chip sets, and commercially available devices and components. As a consequence, the configurations of these arrangements and the manner in which they may be interfaced with an existing digital signal (T1) wireline link have been illustrated in readily understandable block diagram format, which shows only those specific details that are pertinent to the present invention, so as not to obscure the disclosure with details that are readily apparent to one skilled in the art having the benefit of present description.

Figure 1:
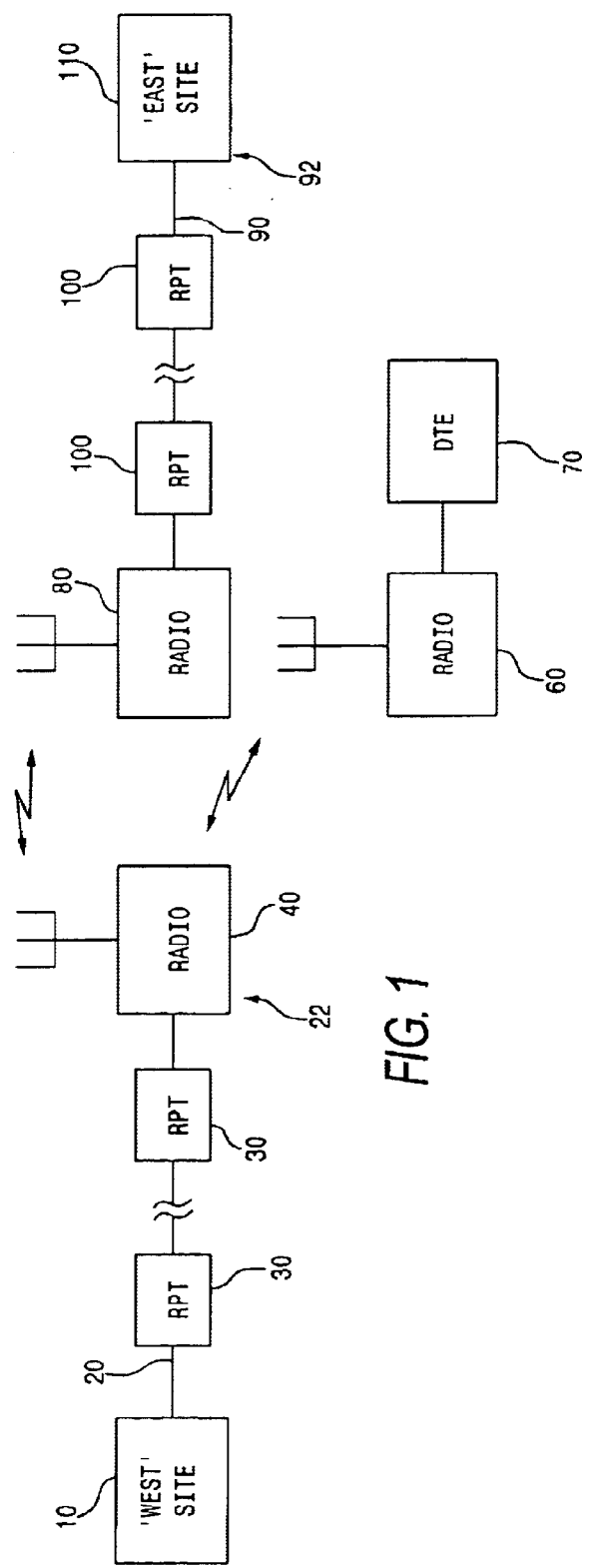
FIG. 1 diagrammatically illustrates a hybrid wireline/radio based digital telecommunications system for conducting digital (T1) communications between a pair of spaced apart 'west' and 'east' sites.

A non-limiting, but preferred embodiment of a digital telecommunication system with which the loop-powered T1 radio of the present invention may be installed is diagrammatically illustrated in FIG. 1 as comprising a first or 'west' site 10, such as a central office, that provides digital (e.g., T1 rate (1.544 Mb/s)) telecommunication service by way of a powered wireline link or span 20 to various digital communication (DS0-based) equipments that are coupled to the wireline. In a typical network, the wireline 20 may include one or more repeaters 30 installed at regular intervals along the link, to provide for substantial land line extended digital service to relatively remote customers served by the network.

A remote (relatively 'eastward' as viewed in FIG. 1) end 22 of the 'west' link 20 is shown as terminating at a wireless transceiver site 40, where it is desired to place a digital communications radio (e.g., 2.4 GHz 'blue tooth' radio) 50, for conducting wireless communications with one or more digital ('blue tooth') radios serving one or more remote customer digital equipments. As a non-limiting example, in the case of a building environment, transceiver site 40 may comprise rooftop or pole-mounted housing fixture that may be coupled to a section of wireline, such as that sourced from a (ceiling-installed) repeater 'can'. As such, transceiver site 40 does not have ready access to a dedicated power supply with which to power a radio at the site.

In a like manner, a remote radio with which the transceiver site 40 is to communicate may correspond to a digital (e.g., blue tooth) radio 60 associated with portable digital terminal equipment 70 (such as a notebook computer), or a remote digital radio 80 that terminates a separate 'east' wireline 90. In the latter instance, the 'east' wireline 90 may be similar to wireline 20 of the 'west' side of the system, in that it is a powered span and may contain one or more repeaters 100 installed at regular intervals, and having a termination end 92 at a remote (central office) site 110.

Figure 2:
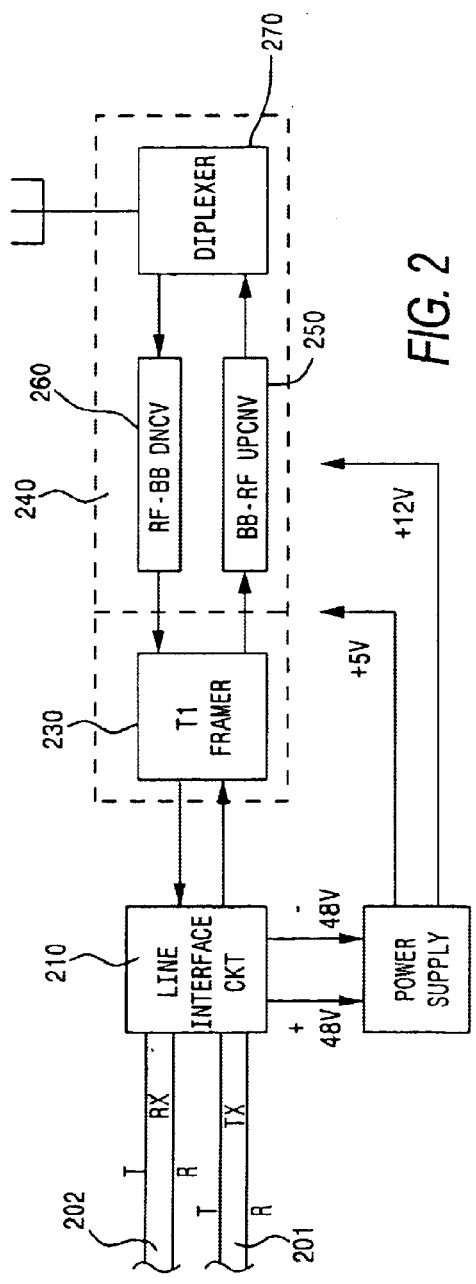
FIG. 2 diagrammatically illustrates the architecture of a wireline-powered T1 radio that may be installed at one or more wireline access points of the system of FIG. 1.

FIG. 2 diagrammatically illustrates the loop-powered digital radio of the present invention, which is configured so that it may be readily installed at a transceiver site where access to the wireline is afforded, but no power supply is available or readily installable, such as the site 40 at the terminal end 22 of the 'west' link 20 or site 80 of the 'east' link 90. As shown in FIG. 2, the loop-powered radio of the invention includes a line interface circuit 210, that is adapted to be coupled to tip (T) and ring (R) portions of respective transmit and receive portions 201 and 202 of a powered T1 wireline link, such as line 20 in the system of FIG. 1. The line interface 210 contains conventional coupling transformer circuitry that extracts the (+/−48 VDC) voltages of the powered tip and ring wireline pairs for application to a power supply 220, on the one hand, and also interfaces digital signals transported by the powered digital wireline to a standard T1 framer chip 230.

The power supply 220 preferably comprises a DC—DC voltage converter circuit of conventional design, which scales down the (+/−48 VDC) voltages supplied by the span to standard voltages (e.g., +5 V and +12 V), that are coupled to the supply rails for the digital signaling and transceiver electronics of the digital radio. In the case of a conventional 'blue tooth' architecture, whose radiated power density specification is relatively constrained, the +/−48 VDC provided by the powered wireline span is more than sufficient to allow the use of a DC—DC converter to power the radio.

The transceiver section 240 of the digital radio is preferably of standard (e.g. 'blue tooth'-compatible) design and includes a transmitter unit 250 and a receiver unit 260. As in a standard (e.g., blue tooth) digital radio, the transmitter unit 250 is coupled to receive the digital baseband signals from the T1 framer chip 230 and perform modulation and up-conversion to an FCC-conformal band RF signal (e.g., 2.4 GHz spread spectrum signal) assigned for unlicensed wireless digital communications. Similarly, in the receive direction, the radio's receiver unit 260 down-converts and demodulates the (2.4 GHz spread spectrum) RF signal coupled through a diplexer 270 to baseband for application to the T1 framer chip 230.

Since the loop-powered radio of the invention is configured to extract electrical power from the span and convert the extracted power to voltages necessary to operate its transceiver and signal processing components, the invention is a totally self-contained architecture that effectively eliminates the need of having to locate the radio where a separate dedicated power supply is either available or can be installed. Thus, the invention may installed practically anywhere access to the powered (T1) wireline is available.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. A method of providing digital communications between a first site and a second site remote from said first site comprising the steps of:

(a) transporting digital communication signals sourced from a first digital communication equipment installed at said first site over a first wireline communication link that also conveys electrical power for a wireline digital communication equipment coupled thereto;

(b) providing a first wireless communication device at a third site remote with respect to said first and second sites;

(c) coupling said first wireless communication device to said first wireline communication link so as to extract electrical power for operating said first wireless communication device from electrical power conveyed over said first wireline communication link, and enable said digital communication signals to be wirelessly transmitted by said wireless communication digital communication equipment for delivery to said second site;

(d) providing a second wireless communication device at a fourth site remote with respect to said third site; and (e) coupling a second wireline communication link, that conveys electrical power for a wireless digital communication equipment coupled thereto and transports digital communication signals thereover, to said second wireless communication device at said, fourth site and to a digital communication equipment installed at said second site, so as to provide electrical power for operating said second wireless communication device and enable said digital communication signals to be received by said second wireless communication device and forwarded over said second wireline communication link to said digital communication equipment installed at said second site.

2. The method according to claim 1, wherein said first wireless communication device comprises a digital radio that is operative to interface T1 rate digital telecommunication signals with said first wireline communication link, and to wirelessly transmit and receive RF energy containing said T1 rate digital telecommunication signals.

3. The method according to claim 1, wherein said first wireless communication device includes:

a line interface coupled to said first wireline communication link, and being operative to extract power therefrom and interface digital telecommunication signals transported thereover;

a wireless transceiver, coupled to said line interface and being configured to wirelessly transmit and receive RF energy containing said digital telecommunication signals; and a DC—DC voltage converter coupled to said line interface and being operative to convert power extracted thereby to voltages necessary to operate said wireless transceiver.

4. The method according to claim 3, wherein said digital communication signals comprise T1 digital communication signals, said line interface includes a T1 framer, and wherein said wireless transceiver includes a transmitter unit that is configured to perform modulation and up-conversion to RF of baseband T1 digital communication signals provided by said T1 framer, and a receiver unit that is configured to perform RF to baseband down-conversion and demodulation of RF energy received thereby and containing T1 digital communication signals for application to said T1 framer.

5. A system for providing digital communications between a first site and a second site remote from said first site comprising:
   a first wireline communication link adapted to transport digital communication signals sourced from a first digital communication equipment installed at said first site and convey electrical power for a wireline digital communication equipment coupled thereto; and
   a first wireless communication device located at a third site remote with respect to said first and second sites, and being operative to extract electrical power for its operation from said first wireline communication link and to wirelessly transmit said digital communication signals for delivery to said second site, wherein
   said first wireless communication device includes
   a line interface coupled to said first wireline communication link, and being operative to extract power therefrom and interface digital telecommunication signals transported thereover;
   a wireless transceiver, coupled to said line interface and being configured to wirelessly transmit and receive RF energy containing said digital telecommunication signals; and
   a DC—DC voltage converter coupled to said line interface and being operative to convert power extracted thereby to voltages necessary to operate said wireless transceiver, wherein
   said digital communication signals comprise T1 digital communication signals, said line interface includes a T1 framer, and wherein said wireless transceiver includes a transmitter unit that is configured to perform modulation and up-conversion to RF of baseband T1 digital communication signals provided by said T1 framer, and a receiver unit that is configured to perform RF to baseband down-conversion and demodulation of RF energy received thereby and containing T1 digital communication signals for application to said T1 framer.

6. The system according to claim 5, wherein said first wireless communication device comprises a digital radio that is operative to interface T1 rate digital telecommunication signals with said first wireline communication link, and to wirelessly transmit and receive RF energy containing said T1 rate digital telecommunication signals.

7. A system for providing digital communications between a first site and a second site remote from said first site comprising:
   a first wireline communication link adapted to transport digital communication signals sourced from a first digital communication equipment installed at said first site and convey electrical power for a wireline digital communication equipment coupled thereto; and
   a first wireless communication device located at a third site remote with respect to said first and second sites, and being operative to extract electrical power for its operation from said first wireline communication link and to wirelessly transmit said digital communication signals for delivery to said second site, further comprising
   a second wireless communication device at a fourth site remote with respect to said third site; and
   a second wireline communication link, that conveys electrical power for a wireless digital communication equipment coupled thereto and transports a digital communication signals thereover, coupled to said second wireless communication device at said fourth site and to digital communication equipment installed at said second site, so as to provide electrical power for operating said second wireless communication device and enable said digital communication signals to be received by said second wireless communication device and forwarded over said second wireline communication link to said digital communication equipment installed at said second site.

* * * * *